(12) United States Patent
Gray

(10) Patent No.: US 9,879,876 B2
(45) Date of Patent: *Jan. 30, 2018

(54) INSULATED HVAC TRANSITION BOX AND ASSEMBLY FOR INSULATING

(71) Applicant: William R. Gray, Raleigh, NC (US)

(72) Inventor: William R. Gray, Raleigh, NC (US)

( * ) Notice: Subject to any disclaimer, the term of this patent is extended or adjusted under 35 U.S.C. 154(b) by 747 days.

This patent is subject to a terminal disclaimer.

(21) Appl. No.: 14/159,069

(22) Filed: Jan. 20, 2014

(65) Prior Publication Data
US 2015/0204622 A1 Jul. 23, 2015

(51) Int. Cl.
| | |
|---|---|
| *F24F 13/02* | (2006.01) |
| *B32B 37/18* | (2006.01) |
| *B32B 5/02* | (2006.01) |
| *B32B 5/18* | (2006.01) |
| *B32B 27/06* | (2006.01) |
| *B32B 27/32* | (2006.01) |
| *B32B 38/00* | (2006.01) |
| *F24F 7/00* | (2006.01) |

(52) U.S. Cl.
CPC .......... *F24F 13/0263* (2013.01); *B32B 5/022* (2013.01); *B32B 5/18* (2013.01); *B32B 27/065* (2013.01); *B32B 27/32* (2013.01); *B32B 37/182* (2013.01); *B32B 38/0004* (2013.01); *B32B 2262/108* (2013.01); *B32B 2266/08* (2013.01); *B32B 2307/304* (2013.01); *B32B 2307/416* (2013.01); *B32B 2315/14* (2013.01); *B32B 2419/00* (2013.01); *F24F 2007/002* (2013.01); *Y10T 29/49428* (2015.01); *Y10T 156/1057* (2015.01)

(58) Field of Classification Search
CPC .... F24F 13/0263; F24F 13/20; F24F 2221/40; F24F 5/18
USPC ......................................................... 454/254
See application file for complete search history.

(56) References Cited

U.S. PATENT DOCUMENTS 3,222,243 A * 12/1965 Gaston ................... E04B 1/767
    156/252
3,559,560 A * 2/1971 Trahan .................. F24F 13/082
    248/343

(Continued)

OTHER PUBLICATIONS

Building insulation materials, https://en.wikipedia.org/wiki/Building_insulation_materials.*

(Continued)

*Primary Examiner* — Helena Kosanovic
(74) *Attorney, Agent, or Firm* — Brian B. Shaw, Esq.; Harter Secrest & Emery LLP

(57) ABSTRACT

An insulated HVAC duct component such as a transition box includes a first insulation layer and a second, different insulation layer. The transition box includes at least four sidewalls and one of a top and a back wall, the transition box further including a first access port and a second access port, the first access port having a different cross section than the second access port, one of the access ports being spaced from a nearest sidewall by less than 2 inches. The first insulation layer is located along an inside surface of the box. The second different insulation layer overlies the first insulation layer, the second different insulation layer having an air impervious surface, wherein the combined thickness of the first insulation layer and the second different insulation layer is less than 2 inches.

16 Claims, 10 Drawing Sheets

(56) References Cited

U.S. PATENT DOCUMENTS

| | | | | |
|---|---|---|---|---|
| 5,900,298 A * | 5/1999 | Syme | ................... | B05B 7/0861 |
| | | | | 428/121 |
| 2007/0245664 A1 * | 10/2007 | Orologio | ................... | B32B 3/28 |
| | | | | 52/508 |
| 2009/0038606 A1 * | 2/2009 | Weinberger | ............. | F24B 1/195 |
| | | | | 126/552 |
| 2014/0202101 A1 * | 7/2014 | Hurst | ................. | E04G 21/3266 |
| | | | | 52/406.2 |
| 2014/0305534 A1 * | 10/2014 | Peil | ...................... | F16L 59/029 |
| | | | | 138/151 |

OTHER PUBLICATIONS

Reflctive insulation: properties, uses, technical data, http://inspectapedia.com/insulation/Reflective_Insulation.php.*

* cited by examiner

INSULATED HVAC TRANSITION BOX AND ASSEMBLY FOR INSULATING

CROSS-REFERENCE TO RELATED APPLICATIONS

None.

STATEMENT REGARDING FEDERALLY SPONSORED RESEARCH OR DEVELOPMENT

None.

REFERENCE TO A "SEQUENCE LISTING"

None.

BACKGROUND OF THE INVENTION

Field of the Invention

The present disclosure relates to insulated HVAC duct components and more specifically to after market preformed insulating components and insulated HVAC transition boxes having a first insulation layer and a second, different insulation layer.

Description of the Related Art

The insulation of ducts, such as HVAC ducts, provides a number of benefits including energy efficiency and noise reduction. Typically, mineral wool insulation is placed inside or outside duct components to provide such benefits. Recent changes in building codes and regulations, however, now require that transition boxes, including register boxes, have increased R values. To increase the R value of and resist thermal transfer in HVAC systems, an increased amount of mineral wool insulation can be used. However, while the thickness of the insulation increases the R value, the increased thickness does not fit within a standard size transition box. For example, a register box typically includes a space of two inches or less between a back wall and a collar and between the sidewalls and the lip of the register box. Although the insulation material can be compressed to fit inside the transition box, this reduces the R value and does not provide sufficient insulation. While the size of the register box can be increased, this is costly, not aesthetically pleasing, and reduces available operable locations for the box.

What is needed then is a transition box which can be manufactured with existing technology and allow installation in existing formats, wherein the register box has increased resistance to thermal transfer. The need also exists for a register box that can be constructed in a relatively reduced size, thereby allowing installation into previously unattainable spaces, while meeting industry or municipal standards for resistance to thermal transfer. A need also exists for an insulating component that can be transported (shipped) in a first configuration and formed into a second operable configuration without requiring any assembly by the installer.

BRIEF SUMMARY OF THE INVENTION

The insulated HVAC duct component of the present system provides for increased resistance to thermal flow and can be constructed with reduced insulation thickness allowing insulation in smaller formats or installation of higher R value transition boxes in previously unavailable locations while meeting increasing municipal or industry standards for resistance to thermal flow.

In one configuration, the insulated HVAC duct component comprises a register box having two sets of opposing sidewalls, a bottom wall, and a top wall having a rectangular outlet and a lip extending into the register box. A mineral wool layer having a first R value is adjacent the inside surface of the box and a reflective laminate layer having a second R value overlies the mineral wool layer.

The insulated HVAC duct component can include an adhesive intermediate the mineral wool layer and the reflective laminate layer. In one construction, the reflective laminate layer includes a base piece of reflective laminate material sized to overlap the bottom wall and two opposing sidewalls of the register box, and side pieces of reflective laminate material sized to overlap the other two opposing sidewalls to dispose the mineral wool intermediate the respective wall and the reflective laminate layer. The back wall of the register box can also include a circular inlet and a collar, wherein the base piece of reflective laminate material includes an aperture for receiving the collar. The mineral wool layer and the reflective laminate layer can be removably secured or retained within the register box by the lip.

In another configuration, an insulated register box for a HVAC duct system is provided, wherein the register box includes four sidewalls forming four corners, an outer mounting flange, a bottom wall having a circular inlet having a collar, and a top wall having a rectangular outlet and an inner rib, the inner rib protruding from the top wall and extending into the rectangular box. A first layer of insulation material having a first R value is adjacent inside portions of the sidewalls, the back wall and front wall. The first layer can engage the lip of the front wall. A second layer of a different insulation material having a second R value is adjacent outside surface of the sidewalls and back wall. The second layer includes an aperture for receiving the collar of the rectangular box.

In yet another configuration, the insulated HVAC duct component includes a transition box at least four sidewalls and one of a top and a bottom wall. The transition box includes a first access port and a second access port, wherein the first access port has a different cross section than the second access port. One of the access ports is spaced from a nearest sidewall by less than 2 inches. A first insulation layer is located along an inside surface of the box and a different second insulation layer overlies the first insulation layer to form a composite. The second different insulation layer has an air impervious surface. The combined thickness of the first insulation layer and the second different insulation layer is less than 2 inches. In a further configuration, the composite has an R value of at least 8.

A method of insulating a transition box is provided including locating a first insulation layer along an inside surface of a transition box and overlying a second air impervious insulation layer on the first insulation layer, wherein the second insulation layer is different from the first insulation layer and wherein a combined thickness of the first insulation layer and the second different insulation layer is less than 2 inches. An adhesive layer may be applied intermediate the first insulation layer and the second insulation layer. A die cut aperture can be formed in the first and second insulation layer sized to receive a collar of the transition box. The method can also include locating a perimeter edge of the first and second insulation layers behind a lip of the transition box.

Another method of insulating a transition box includes locating a first insulation layer having a first R value along an inside surface of a transition box, engaging a perimeter edge of the first insulation layer with a lip of the transition box, locating a second insulation layer having a second R value along an outside surface of a transition box, and folding triangular corner tabs of the second insulation layer against an outer surface of the second insulation layer. The triangular corner tabs can be secured to the transition box and/or the outer surface of the second insulation layer.

In a further configuration, an insulating assembly for an HVAC duct component is provided, wherein the insulating assembly includes a reflective laminate body having a base, a first sidewall extending from the base and a second sidewall extending from the base, at least one of the sidewalls terminating at a free edge; the base and the sidewalls movable between a first transport configuration wherein a majority of the base and a majority of each of the sidewalls are parallel and an installation configuration wherein the sidewalls are inclined relative to the base; and the reflective laminate including an upper reflective layer, a bottom reflective layer and a cellular layer intermediate the upper reflective layer and the bottom reflective layer.

In one configuration, a portion of the first sidewall of the insulating assembly is affixed to a portion of the second sidewall, independent of the base. The portion of the first sidewall can be affixed to the portion of the second sidewall by a fastener. It is contemplated the base, the first sidewall and the second sidewall can be integral.

In a further configuration, the least one of the base, the first sidewall and the second sidewall includes a line of weakness for removing a corresponding portion of the at least one of the base, the first sidewall and the second sidewall. In an alternative construction, at least one of the base, the first sidewall and the second sidewall includes a cutout removing a corresponding portion of the at least one of the base, the first sidewall and the second sidewall.

A layer of mineral wool can be operably located adjacent to one of the first sidewall and the second sidewall and the base. The layer of mineral wool can be parallel to and spaced from one of the first sidewall and the second sidewall and the base.

The insulating assembly can further include a first polymeric layer bonded to the upper reflective layer, the cellular layer bonded to the first polymeric layer, a second polymeric layer bonded to the cellular layer and the bottom reflective layer bonded to the second polymeric layer.

The insulating assembly can include a fold line between each of the sidewalls and the base and in select configurations, least one of the fold lines can include a score line.

The insulating assembly can further include a third sidewall and a fourth sidewall, wherein each of the third and fourth sidewalls includes a collapsing fold line.

The insulating assembly can further include an adhesive on an exposed surface of one of the base and the sidewalls.

The insulating assembly can cooperatively engage an HVAC component, such as a transition box, thermally coupled to the reflective laminate body. The reflective laminate body can be located adjacent an inside surface of the transition box. Alternatively, the reflective laminate body can be adjacent an outside surface of the transition box.

The insulating assembly can further include a second reflective laminate body, wherein the reflective laminate body is adjacent an outside surface of the transition box and the second reflective laminate body is adjacent an inside surface of the transition box.

Another method is provided of moving a plurality of sidewalls of a reflective laminate insulating assembly from a first transport configuration, wherein a majority of a base and a majority of each of the plurality of sidewalls are parallel to an installation configuration, wherein each of the plurality of sidewalls is inclined relative to the base; and disposing the reflective laminate insulating assembly in the installation configuration about a portion of an HVAC duct component to inhibit thermal transfer to or from the HVAC duct component.

In one version, the HVAC duct component can be metallic, and wherein the HVAC duct component can be an HVAC transition box.

The method can also include locating the reflective laminate insulating assembly adjacent an inside surface of the HVAC duct component.

Similarly, the method can include locating the reflective laminate insulating assembly adjacent an outside surface of the HVAC duct component.

A method is provided including cutting a planar sheet of reflective laminate having an upper reflective layer, a first polymeric layer bonded to the upper reflective layer, a cellular layer bonded to the first polymeric layer, a second polymeric layer bonded to the cellular layer and a bottom reflective layer bonded to the second polymeric layer, to have a base, a first sidewall and a second sidewall; rotating the first sidewall about a first bend line to dispose the first sidewall inclined relative to the base; rotating the second sidewall about a second bend line to dispose the second sidewall inclined relative to the base; joining a portion of the rotated first sidewall and a portion of the rotated second sidewall to form an assembly including the base, the first sidewall and the second sidewall; and collapsing the assembly to dispose a majority of the first sidewall, a majority of the second sidewall and a majority of the base in a parallel orientation, wherein at least a portion of one of the first and the second sidewall overlies a portion of the base.

The method can also include cutting a layer of the reflective laminate along one of the first bend line and the second bend line.

In a further configuration, an insulated HVAC duct component is provided having a transition box having at least four sidewalls, a back wall, and a front wall having a first access port, wherein at least a portion of the back wall is formed of a duct board; a mineral wool layer having a first R value, the mineral wool layer adjacent one of an inside surface and an outside of the transition box; and a reflective laminate layer having a second R value, the reflective laminate layer located at one of inside the transition box and outside the transition box.

In this configuration, it is contemplated the duct board portion of the back wall includes a second access port fluidly connected to the first access port. It is also understood the mineral wool layer can be intermediate the reflective laminate layer and the back wall.

An additional method is provided including locating a reflective laminate about an HVAC component, the HVAC component at least partially formed by duct board; and cutting an access port through a portion of the duct board and the reflective laminate.

In a further configuration, an insulating assembly is provided, wherein the assembly has a reflective laminate body including a first pair of opposing sidewalls extending from a base and a second pair of opposing sidewalls extending from the base with each of the sidewalls terminating at a free edge. The base and the sidewalls are movable between a first transport position wherein a majority of the base and a majority of the sidewalls are parallel and an installation configuration wherein the sidewalls are perpendicular to the base. The reflective laminate includes an upper reflective layer, a bottom reflective layer and a cellular layer intermediate the upper reflective layer and the bottom reflective layer. It is further contemplated the

DETAILED DESCRIPTION OF THE INVENTION

Figure 1:
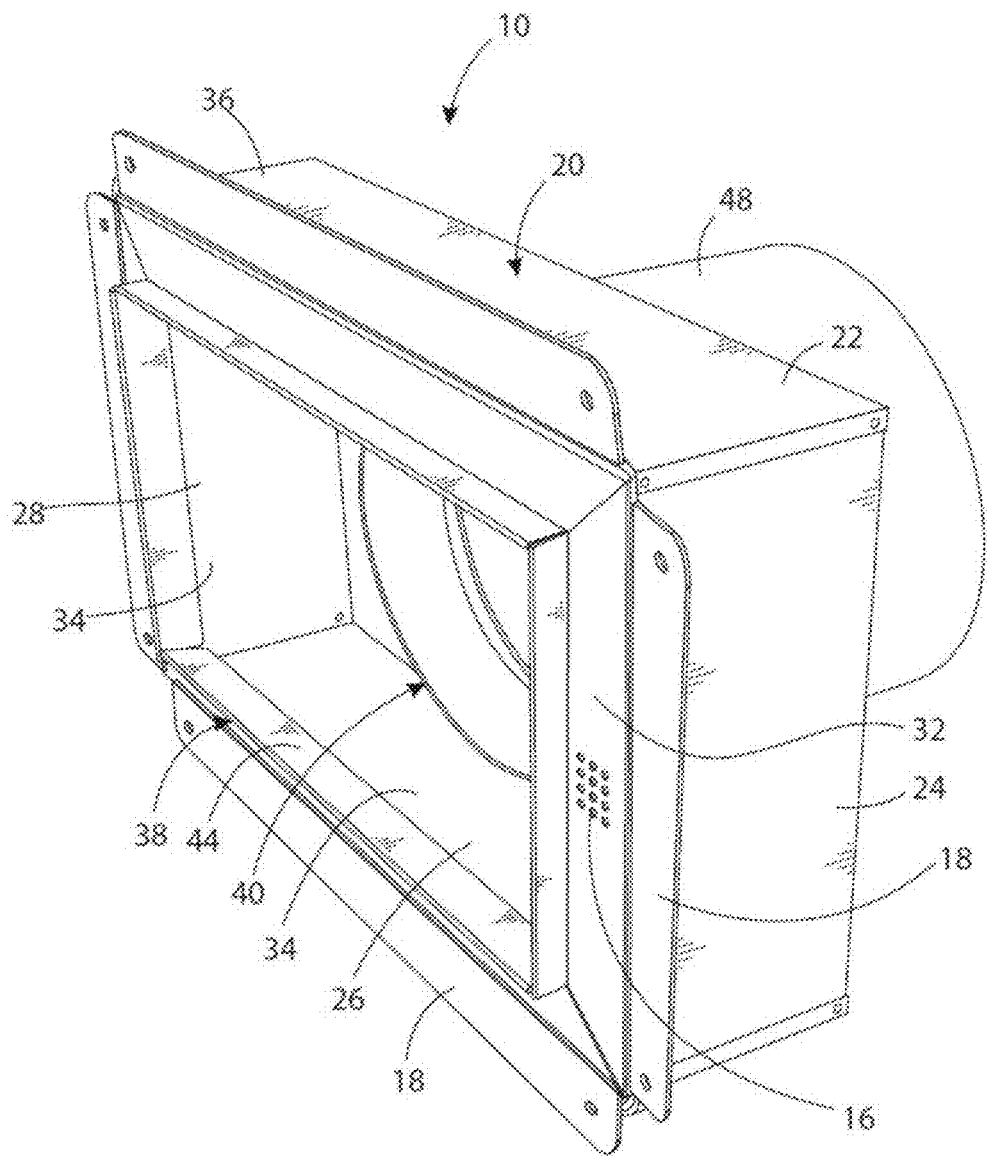
FIG. 1 is a perspective view of a register box without layers of insulation.

At the outset, it should be appreciated that the use of the same reference number throughout the several figures designates a like or similar element.

Referring to the Figures, an insulated HVAC duct component 10 includes an HVAC transition box 20, a mineral wool layer 50, and a reflective laminate layer 60. The HVAC transition box 20 (or transition box) includes fittings, collars, takeoffs, register boxes, boxes, boots, stacks, register boots, stackheads, reducers, elbows, caps and plenums. In one configuration, the transition box 20 includes sidewalls 22, 24, 26, 28, a back wall 30, and a front wall 32. The transition box 20 further includes an inside surface 34 and an outside surface 36, two access ports 38, 40 having different cross sections. In one configuration, the transition box 20 includes a rectangular access port 38 having a rectangular outlet framed by a depending rectangular lip 44 that is dimensioned for a snug sliding fit within the rectangular outlet. The lip 44 is spaced from the adjacent sidewall 22, 24, 26, 28 of the transition box 20 by a given fixed distance. Typical spacing between the lip 44 and the adjacent sidewall 22, 24, 26, 28 is less than approximately one inch, and can be as little as half an inch. The transition box 20 can further include a circular access port 40 having a circular inlet and a collar 48.

The rectangular outlet is dimensioned for registration with a diffuser (not illustrated). The circular inlet or access port 40 typically has an inner diameter of 7⅛ inches and forms an opening for receiving pressurized air conducted through a branch conduit of a HVAC system.

A first insulation layer, such as the mineral wool layer 50, having a first R value and a first thickness is located along an inside surface 34 of the transition box 20 as shown in FIGS. 2, 3, 6, and 7. The mineral wool layer 50 has a thickness no greater than the spacing between the lip 44 and the adjacent sidewall, and is thus less than one inch. In most prior constructions, the thickness of the mineral wool layer 50 is between one and three-quarters inch.

Figure 2:
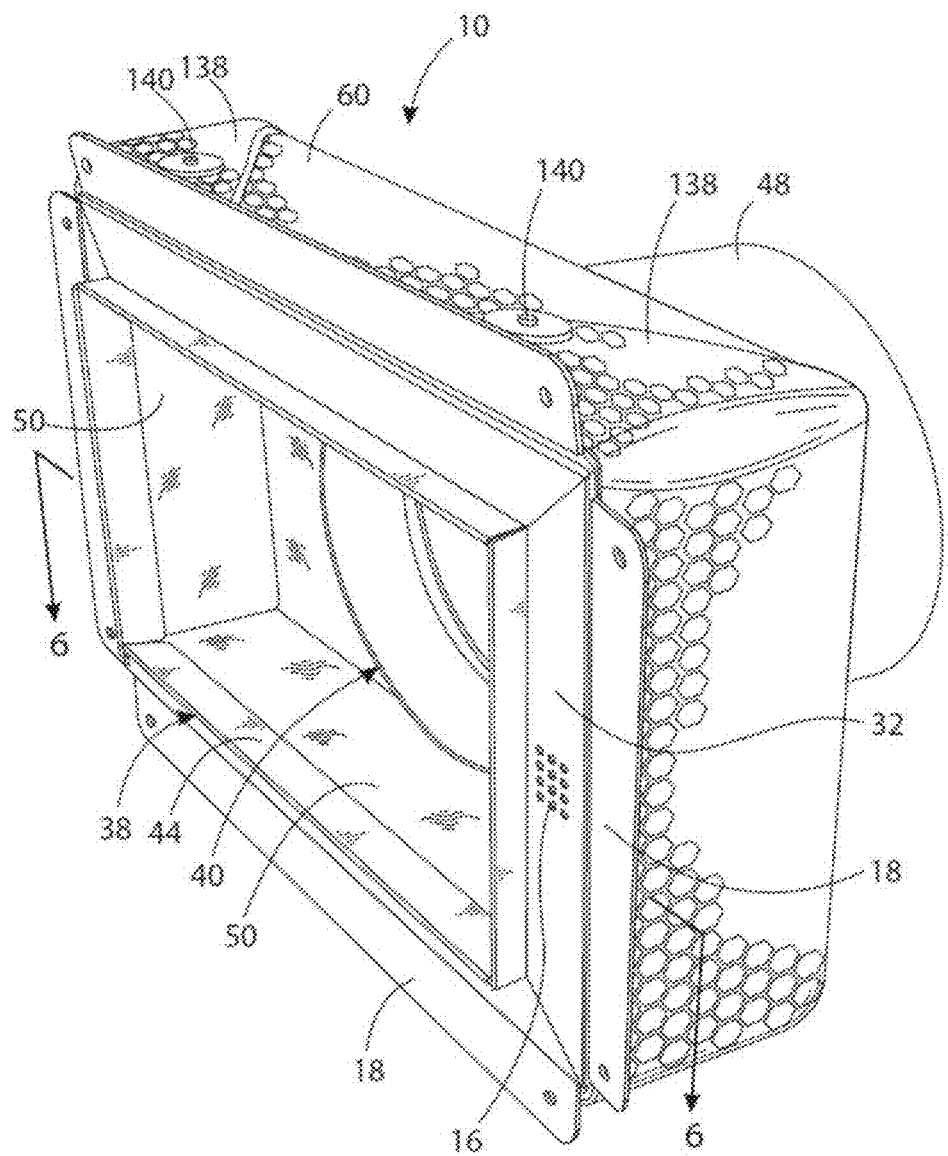
FIG. 2 is a perspective view of one configuration illustrating a first insulation layer located along an inside surface of the register box and a second insulation layer located along an outside surface of the register box.
Figure 3:
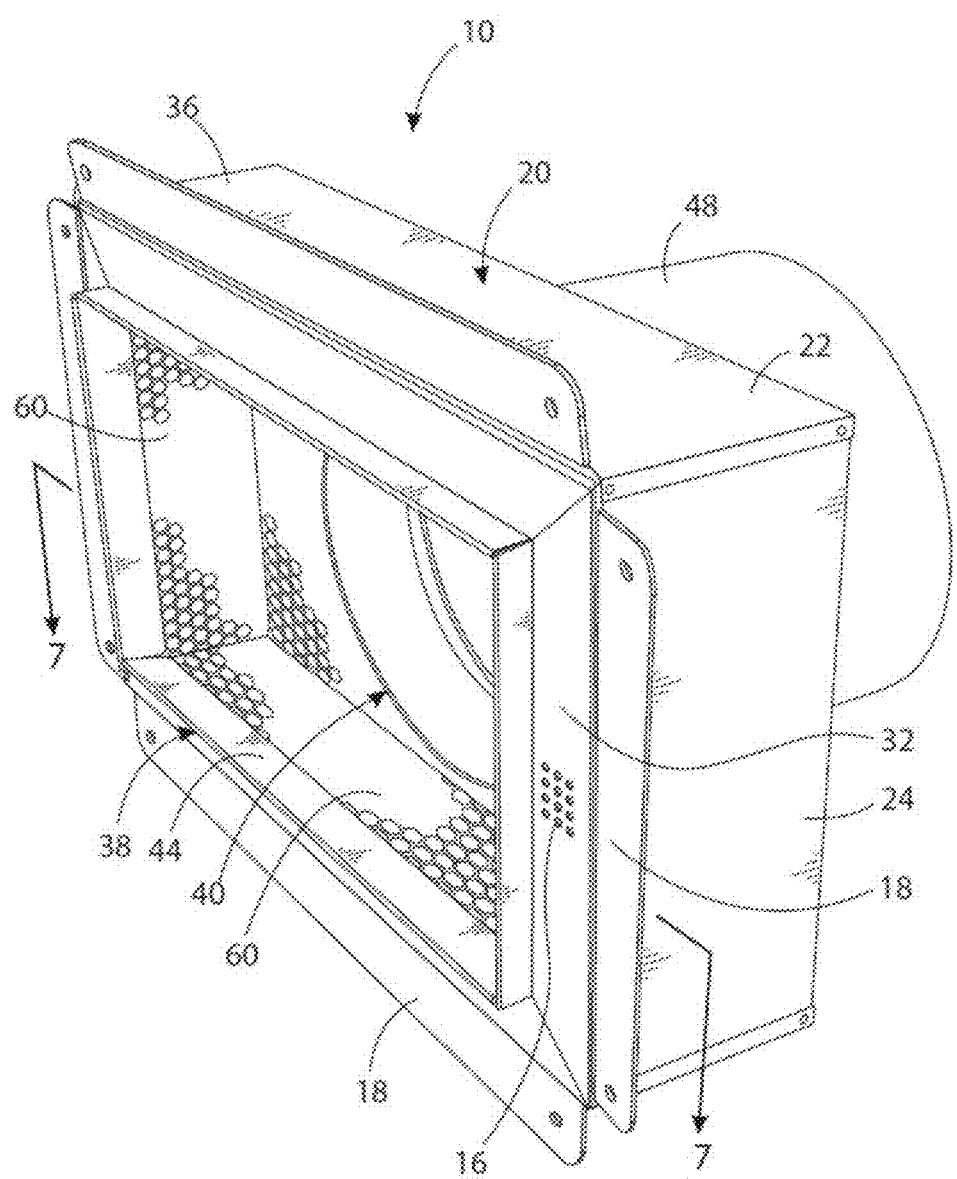
FIG. 3 is a perspective view of another configuration showing the first insulation layer located along the inside surface of the register box and the second insulation layer overlying the first insulation layer.
Figure 4:
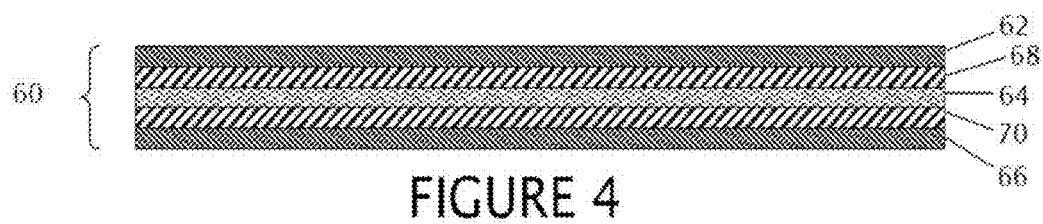
FIG. 4 is an exploded schematic view of the reflective laminate layer.
Figure 5:
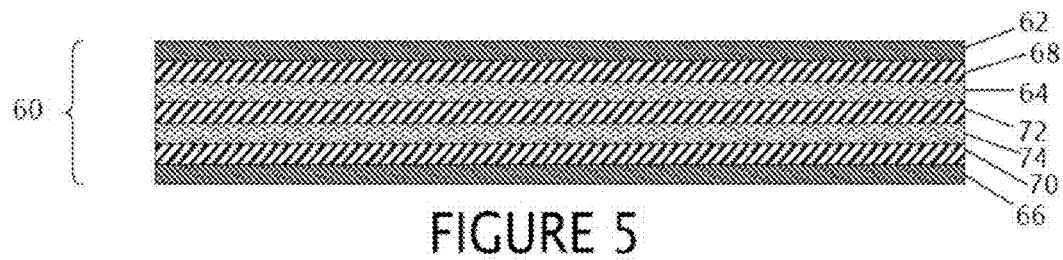
FIG. 5 is an exploded schematic view of an alternative construction of the reflective laminate insulation layer.
Figure 6:
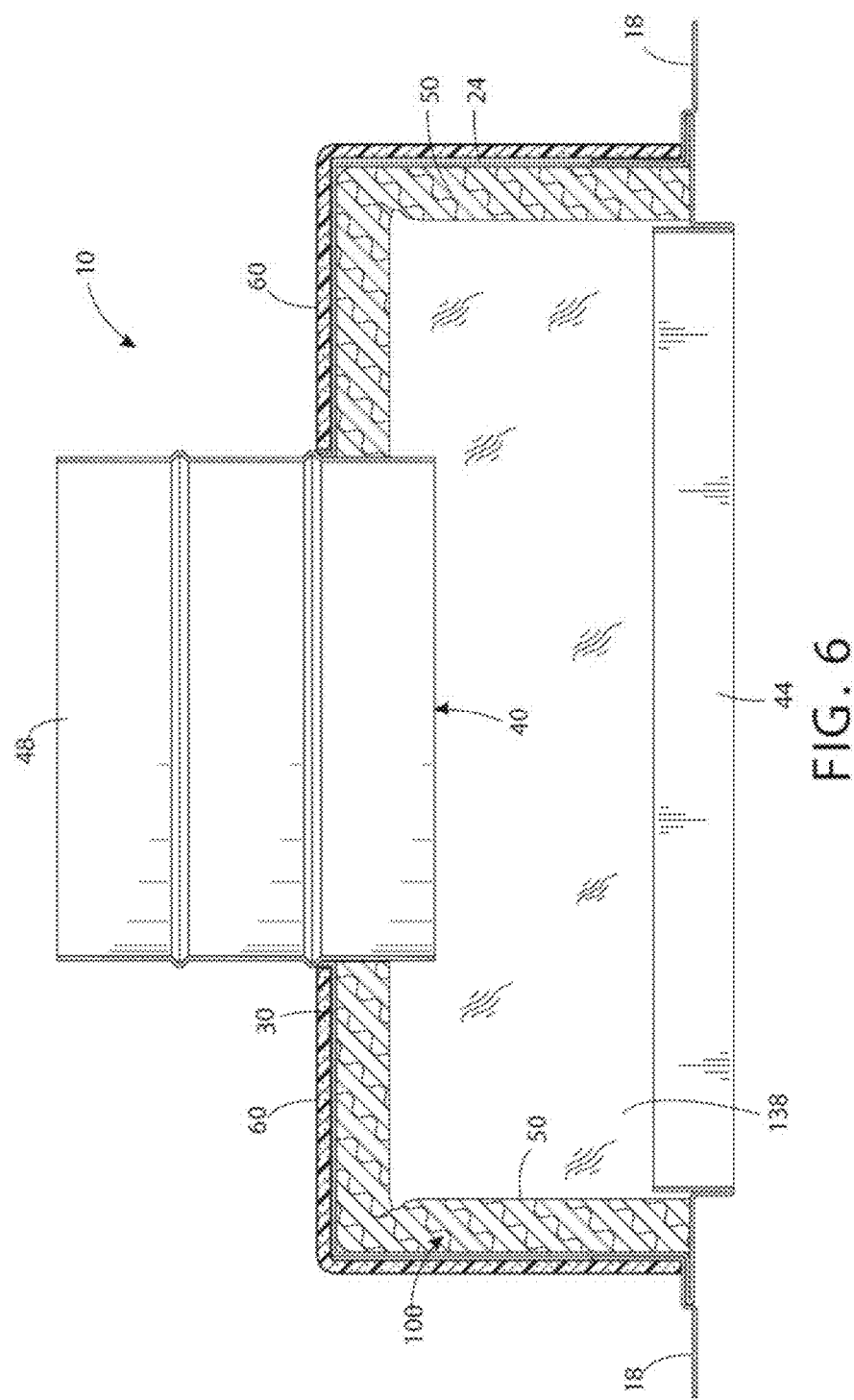
FIG. 6 is a cross sectional view of the register box taken generally along line 6-6 in FIG. 2 illustrating the first insulation layer located along the inside surface of the register box and the second insulation layer located along the surface of the register box.
Figure 7:
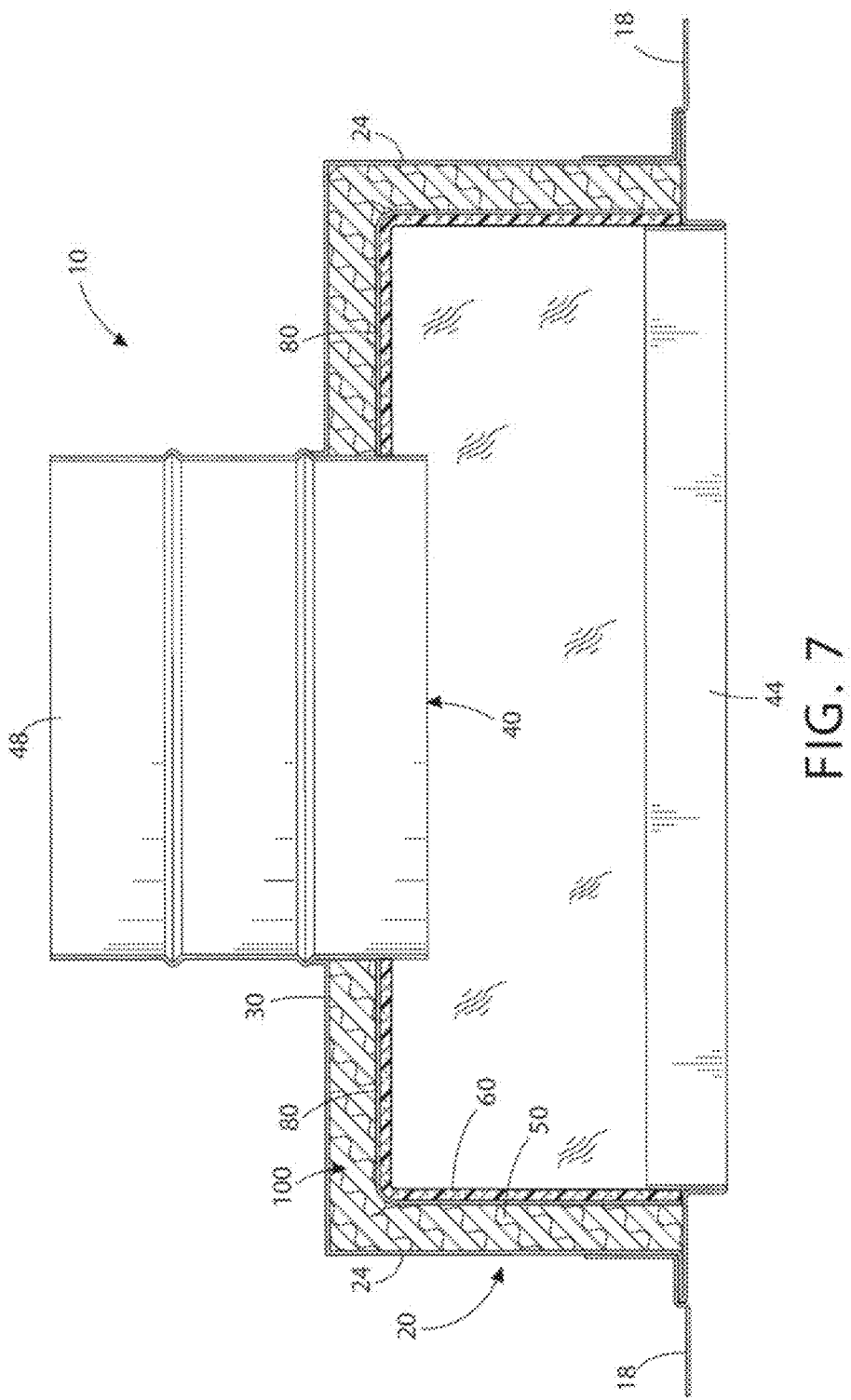
FIG. 7 is a cross sectional view of the register box taken generally along line 7-7 in FIG. 3 illustrating the first insulation layer located along the outside surface of the register box and the second insulation layer overlying the first insulation layer.

In one configuration, the second insulation layer, such as the reflective laminate layer 60, is adjacent the outside surface of the transition box 20, as shown in FIGS. 2 and 6 and as described in more detail infra. In another configuration, the second insulation layer 60 overlies the first insulation layer, such as the mineral wool layer 50, inside the transition box as shown in FIGS. 3 and 7.

The second insulation layer can be a reflective laminate having an air impervious surface, a second R value and a second thickness, wherein the second thickness is different from the first thickness. In the overlaying construction of the two layers of insulation, the layers form a composite that can be unbonded or bonded. Thus, a bonding layer 80 may be included between the first insulation layer 50 and the second insulation layer 60, such as the mineral wool layer 50 and the reflective laminate layer 60. In one configuration, the bonding layer 80 operably bonds the second insulation layer 60 to the first insulation layer 50 to form a bonded composite 100. The bonding of the second (reflective) insulation layer 60 and the first (mineral wool) insulation layer 50 is such that no intermediate gap is formed between the layers of the composite. That is, the second insulation layer 60 is contiguous with the mineral wool insulation layer (first insulation layer) 50. The bonding of the second insulation layer 60 and the first insulation layer 50 can be formed by a variety of adhesives, such as the water soluble adhesives. In one construction, the adhesive partially penetrates the mineral wool fibers and thus forms an integral bond between the first mineral wool layer 50 and the (second) reflective laminate layer 60. Thus, no additional air gaps are formed by the bonding layer 80 between the mineral wool layer 50 and the reflective laminate layer 60. It is further contemplated that the adhesive can be selected such that the bonding layer 80 increases the rigidity of the composite 100. That is, the bonded composite 100 can be self-supporting.

For purposes of this disclosure, the mineral wool layer 50 is a low density nonwoven fiber formed into a layer, wherein the fibers are made from minerals or metal oxides, and can be synthetic or natural. Typically, man made mineral fibers (MMMF) generally refer to synthetic materials. This includes fiberglass, ceramic fibers and rock wool, also known as stone wool. The mineral wool layer 50 can include organic fibers such as polymeric fibers or inorganic fibers such as rotary glass fibers, textile glass fibers, stonewool (also known as rockwool) or a combination thereof. Mineral fibers, such as glass fibers, have been found satisfactory.

The mineral wool layer 50, sometimes referred to as a batt or blanket insulation generally spans densities in the range of about 0.5-7 lb/ft³ (8-112 kg/m³) and preferably about 1-4 lb/ft³ (16-64 kg/m³), and more preferably 0.3 to 1.5 lb/ft³ (4.8-24 kg/m³). The mineral wool layer 50 is usually provided in continuous sheeting that is sometimes cut to preselected lengths, thus forming batts. The thickness of the mineral wool layer 50 is generally proportional to the insulated effectiveness or "R value" of the insulation.

The R value is a commercial unit used to measure the effectiveness of thermal insulation. That is, the R value is a measure of the capacity of a material, such as insulation, to impede thermal flow, with increasing values indicating a greater capacity. Thermal conductance of a material is measured, in traditional units, in BTUs of energy conducted times inches of thickness per hour of time per square foot of area per Fahrenheit degree of temperature difference between the two sides of the material. The R value of the insulator is defined to be 1 divided by the thermal conductance per inch. This means R value is an abbreviation for the complex unit combination hr·ft²·° F./Btu. In SI units, an R value of 1 equals 0.17611 square meter kelvins per watt (m²·K/W). As defined R value is $$Rvalue = \frac{\Delta T \cdot A \cdot t}{HeatLoss}$$

where Δ is the temperature difference in degrees Fahrenheit, A is the area in square feet, t is the time in hours, and HeatLoss is the heat loss in BTUs. Typical R values for the mineral wool layer 50 is between approximately 3.1/inch to 4.3/inch thickness of the layer.

In some embodiments, a vapor retarder facing layer 52, which may be a cellulosic paper, typically formed from Kraft paper, coated with a bituminous adhesive material, such as asphalt, or polymeric film, such as LDPE (low density polyethylene), is provided on one major surface of the mineral wool layer 50. The facing layer and bituminous layer together form bitumen-coated Kraft paper.

The second or reflective laminate layer 60 is a laminate that includes an upper reflective layer 62, a lower reflective layer 66 and an intermediate cellular layer 64.

In one construction, the cellular layer 64 is comprised of a multitude of closed cells. While the cellular layer 64 can be formed of open cells, as the closed cells provide enhanced resistance to thermal flow, the closed cell structure has been found satisfactory. The closed cells of the cellular layer 62 can be formed from a foamed polymer including thermoplastics, thermosets or thermoplastic elastomers, as is well known. Alternatively, the cellular layer 62 can be formed of a multitude of sealed pockets, each retaining a volume of air or other gas. The cellular layer 62 can have any of a variety of thickness, such as but not limited to ³⁄₁₆ inch to one half inch.

The pockets of the cellular layer 64 can be in form of a layer of discrete bubbles, or multiple layers of bubbles as defined by a polymer. The discrete bubbles can be as small as ¹⁄₁₀ inch in diameter, to as large as an inch or more. In addition, the volume of gas retained within the bubble can be controlled to provide differing degrees of thermal protection or control the resulting thickness of the cellular layer. That is, the bubble may be under a positive pressure, rather than merely retaining a volume of gas.

In one configuration, the reflective laminate 60 can include at least five layers—the upper and lower reflective layers 62, 66, a polymer layer 68, 70 adjacent each reflective layer 62, 66, wherein each polymer layer is selected to increase strength of the laminate and the cellular layer 64 intermediate the two polymer layers. Polyethylene has been found a satisfactory polymer for the polymer layer. Thus, for example, each reflective layer 62, 66 can be bonded to a polyethylene layer 68, 70, wherein the polyethylene layers sandwich the cellular layer 64 therebetween. Alternatively, the reflective laminate 60 can be formed with three layers—the upper reflective layer, the lower reflective layer and the intermediate cellular layer, wherein the upper and lower layers sandwich the cellular layer and a bonding such as adhesive or ultrasonic welding joins the layers together.

In a further construction, the reflective laminate (or second insulation layer 60) can include two cellular layers 64, 74, wherein the two cellular layers are connected by an intermediate polymer layer 72, such as a polyethylene layer. Thus, the second insulation layer 60 can have the five layer construction including (i) the upper reflective layer 62, (ii) the polymeric layer 68, (iii) the cellular layer 64, (iv) the polymer layer 70, and (v) the lower reflective layer 66, or the seven layer construction including (i) the upper reflective layer 62, (ii) the polymer layer 68, (iii) the cellular layer 64, (iv) the polymer layer 72, (v) the cellular layer 74, (vi) the polymer layer 70, and (vii) the lower reflective layer 66.

A satisfactory reflective laminate 60, as the second insulation layer, is a foil/bubble reflective insulation marketed by Reflectix, Inc of Markleville Ind. under the mark Reflectix®, including either the single bubble or double bubble product.

In one construction, the second insulation layer 60 is the Reflectix® double bubble product having a nominal thickness of ⁵⁄₁₆ inch and an R value of approximately 4.2. In this construction, the mineral wool layer 50 has a thickness of one inch and an R value of approximately 4 to 4.2, and the R value of the resulting composite 100 is approximately 8, and has a thickness of approximately 1⁵⁄₁₆ inch. Thus, the two layers of insulation are of different materials and different thickness.

In contrast, as set forth by Reflectix® publications, if the Reflectix® product (second insulation layer 60) is simply doubled (that is two Reflectix® reflective laminate 60 layers are directly bonded together), the resulting construction has an R value of approximately 5.3, rather than the expected 8.4 of the combined R values. Thus, merely doubling the reflective laminate layer 60 does not provide the desired R value. Further, pursuant to Reflectix® company literature, a ¾ inch air space is recommended on each side of the second insulation layer 60. Such spacing thus requires a 1¹³⁄₁₆ wide gap thereby limiting installation of the composite 100. Alternatively, if the mineral wool layer 50 were used to obtain an R value of 8, the mineral wool layer 50 would have a thickness of approximately two inches.

The composite of the first insulation layer (the mineral wool layer) 50, and the second insulation layer (the reflective laminate layer) 60, can be constructed such that the R value of the composite 100 is greater than, less than or equal to the R value of the mineral wool layer 50. Further, the R value of the composite 100 is at least 80% of the sum of the first R value and the second R value. In certain constructions, the R value of the composite is at least 90% and can be 95% of the sum of the R value for the reflective laminate and the R value of the mineral wool layer. For example, as the reflective laminate layer as the second insulation layer 60 has an R value of approximately 4.2 and the first insulation layer as the mineral wool layer 50 has an R value of approximately 4.2, the composite 100 has an R value of at least approximately 80% of an 8.4 R value and in selected constructions an R value of at least 90% of the added R value of the second insulation layer (the reflective laminate layer) 60 and the first insulation layer (the mineral wool insulation layer) 50.

The composite 100 can have a thickness that is less than twice the mineral wool layer 50, yet have an R value that is substantially equal to twice the R value of the mineral wool layer 50. For example, the reflective laminate can have an R value of 4 with a 5/16 inch thickness and the mineral wool layer can have an R value of 4 with a one inch thickness, the resulting composite 100 (bonded or unbonded) having an R value of 8 and a thickness of 1 5/16 inch. As two directly bonded reflective laminates, (if bonded together without intermediate air gap) exhibit an R value of approximately 5.3 (4.2+1.1), the composite 100 has an R value that is greater than the R value of bonded reflective laminate layers.

It is understood the composite 100 can be formed with variety of thicknesses of the mineral wool layer 50. For example, if the mineral wool layer 50 is sized to provide an R value of 6, then the resulting composite 100 has an R value of approximately 10.

Conversely, the second insulation layer 60 can be used in combination with a relatively thin mineral wool layer 50, such as one having a R value of 2 (7/16 inch thick). Thus the R value 4 of the second insulation layer 60 provides a composite 100 having an R value of approximately 6 with a thickness of 3/4 inch in contrast to a thickness of 1.5 inches in prior constructions.

Although the first insulation layer is set forth as the mineral wool layer and the second insulation layer is set forth as the reflective laminate layer, it is understood the first insulation layer and the second reflective laminate layer can be any two different insulation materials, with or without an air gap, wherein the air gap is within one of the layers or formed between the two layers.

That is, the composite 100 is formed of two different insulation materials, wherein one or each of the insulation materials can be a single material or layer or laminate.

As the present construction provides for comparable R values at reduced thickness (as compared to prior constructions) the HVAC components to be insulated by the present construction can be of standard or reduced size, thereby reducing material costs. Further, reduced sizing allows installation in previously inaccessible locations.

It is contemplated that the insulated HVAC duct component 10 can be any type of duct component used in an HVAC system where insulation is desired. Without limiting the scope of disclosure, the first and second insulation layers 50, 60 are set forth in terms of operable connection with the ducts 10 in the configuration of a transition box 20, including but not limited to a register box, plenum box, ceiling box, register boot, stack boot, box, boot, stack, and stackhead. Register boxes 20 are employed to distribute a pressurized air flow from a main or trunk duct to a room interface. As the register box 20 is located at the exposure to a room, the register box is typically located in areas of limited spacing. That is, the register box 20 typically must conform to a given size limitation.

Referring to FIG. 1, the register or air distribution box 20 is constructed of sheet-metal, such as galvanized 30-gauge steel panels forming sidewalls 22, 24, 26, 28, the back wall 30, front wall 32, and an outer flange 18. In one configuration, the sidewalls 22, 24, 26, 28 are constructed from a single blank of galvanized sheet metal steel. Opposing sidewalls 22, 26 and 24, 28 and the back wall 30 include flange portions that are folded over the sidewalls and are staked together to form a mechanically stable unit. When assembled and connected together, the sidewalls 22, 24, 26, 28, the front wall 32 and the back wall 30 provide boundaries for an air distribution chamber of the register box 20. For the exemplary embodiment shown in FIG. 1, the register box 20 dimensions are 14 inches by 3½ inches by 8 inches. The front wall 32 may also include vents 16 for venting the insulation layers 50 and/or 60.

Although the HVAC component is described in terms of a metal construction, it is understood that a variety of materials can be used to for the component, such as laminates, plastics and alloys.

Thermal insulation, in the form of the composite 100 (bonded or unbonded) or the mineral wool layer 50 on one side of the box and the reflective laminate layer on the other side, is added to the internal surfaces of the sidewalls of the register box to prevent heat transfer and for noise reduction purposes. However, as the footprint of the register box 20 is limited and the relative size of the air passageways must be maintained, the available space for insulation is restricted.

The present insulation layers 50, 60 can be disposed within the available standard spacing in an existing register box 20 as shown in FIGS. 3 and 7, yet provide enhanced R value such as R8.

Figure 8:
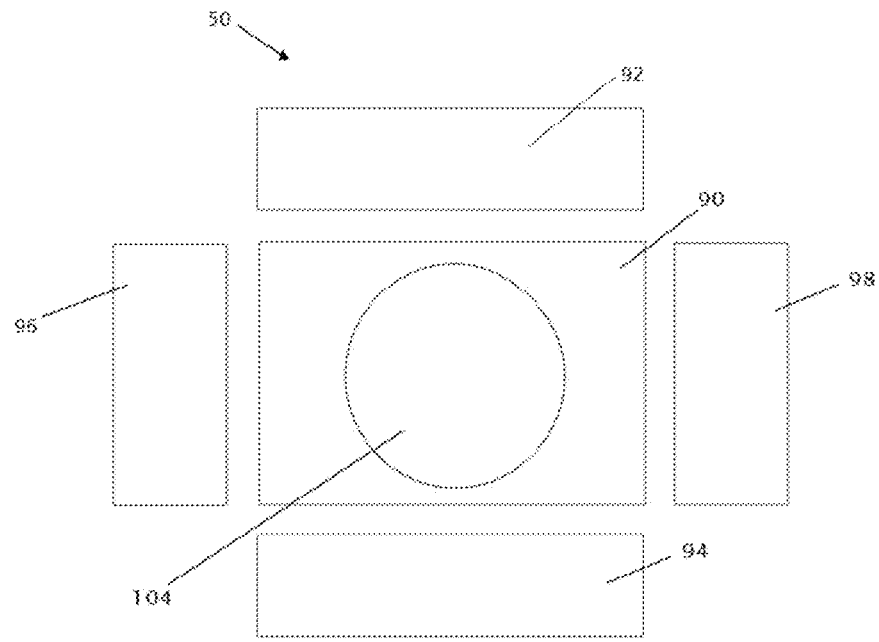
FIG. 8 is a perspective view of components of the insulated register box showing the first and second insulation layers configured to be inserted into a register box.
Figure 9:
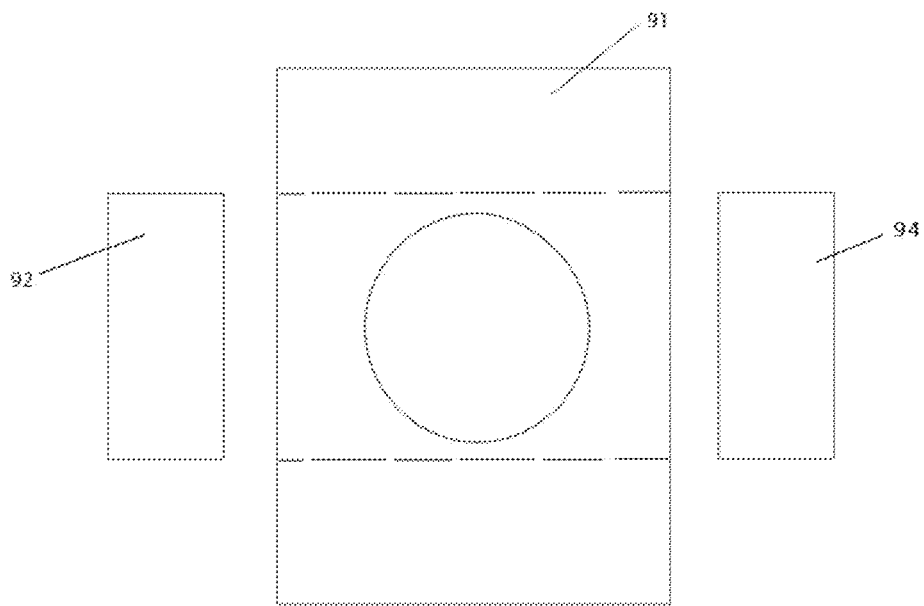
FIG. 9 is a front view of the second insulation layer configured to be inserted into a register box.

The first and second insulation layers 50, 60 can be disposed within the register box 20 so that the exposed surface of the second insulation layer (the reflective laminate) 60 contacts the air flow through the register box 20. Thus, the reflective layer of the reflective laminate defines the surface of insulation that is exposed to the air flow through the HVAC duct and reduces the entrainment of the underlying mineral wool layer 50 in the air flow. This improves indoor air quality. In this configuration, as shown in FIG. 8, the insulation layers 50, 60 includes a base piece 90 sized to overlap the back wall 30 of the register box 20, two pieces 92, 94 sized to overlap two opposing sidewalls 22, 26 and two pieces 96, 98 sized to overlap two opposing sidewalls 24, 28 of the register box 20. The base piece 90 includes an aperture 104 for receiving the collar 48 of the register box 20. For the exemplary embodiment shown in FIG. 1, wherein the register box 20 dimensions are 14 inches by 3½ inches by 8 inches, the base piece 90 sized to overlap the back wall is about 12 inches by 8 inches, two of the sidewall pieces 92, 94 are about 12 by 3½ inches and two of the sidewall pieces 96, 98 are about 8 inches by 3½ inches. In an alternative configuration, as shown in FIG. 9, the first and second insulation layers 50, 60 include a base piece 91 sized to overlap the back wall 30 and the two opposing sidewalls 22, 26 of the register box 20 and side pieces 92, 94 sized to overlap the other two opposing sidewalls 24, 28. That is, the base piece 91 is about 15 inches by 12 inches and the side pieces 92, 94 are each about 8 inches by 3½ inches.

Figure 10:
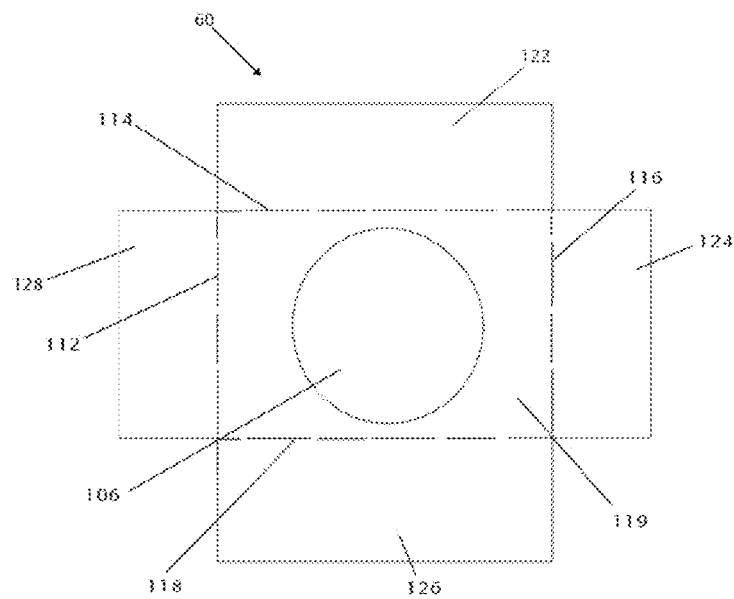
FIG. 10 is a perspective view of components of the insulated register box showing a configuration of the first and second insulation layers configured to be inserted into a register box.

As shown in FIG. 10, the reflective laminate 60 may include a single piece blank of reflective laminate 60 having four base forming fold lines 112, 114, 116, 118, a base 119, and four side flaps (sidewalls) 122, 124, 126, 128. The four side flaps 120, 122, 124, 126 are typically formed by removing corner portions of the reflective laminate and bending the flaps 122, 124, 126, 128 along the base forming fold lines 112, 114, 116, 118. The second insulation layer 60 typically includes a die-cut aperture 106 for receiving the collar 48, although it should be appreciated by those having ordinary skill in the art that other methods may be used to form the aperture in the second insulation layer. For the exemplary embodiment shown in FIG. 1, wherein the transition box 20 dimensions are 14 inches by 3½ inches by 8 inches, the reflective laminate layer 60 has the following dimensions: the base measures about 12 inches by 8 inches and each flap measures about 8 inches by 3½ inches.

Thus, a self-supporting reflective laminate 60 forming an insulating assembly 160 is formed by folding each of the side flaps (sidewalls) 120, 122, 124 and 126 about the respective fold line and joining the abutting edges or corresponding portions of the sidewalls to form (or retain) the sidewalls generally perpendicular to the base 119. Fasteners, including but not limited to tape, staples, stitching, bonding, ultrasonic welding or adhesives can be used affix abutting side flaps to each other. Fasteners includes mechanical fasteners such as staples, rivets, barbs, darts, clips.

In a further configuration, the sidewalls 120, 122, 124 and 126 can include mating tabs and slots, wherein the tab or tabs of one sidewall are received into corresponding slots 129 on an adjacent sidewall to engage the walls and dispose the laminate in a self-supporting orientation, such as the insulating assembly 160. In this configuration, no mechanical fasteners are required to retain the insulating assembly 160 in the operable orientation. That is, a substantially self supporting orientation able to retain the assembly in the operable configuration.

The fold lines, such as fold lines 112, 114, 116, 118, can include a line of weakness such as a score, perforation or even stressed section of material. The line of weakness can be used to promote folding of the respective wall or relative to the base. As set forth herein, the remaining material along the fold line forms a hinge about which the respective components of the insulating assembly 160 can pivot for transition from a storage/shipping configuration to use or installation configuration.

It is further understood, the line of weakness can be sufficient depth or fracture of material of the reflective laminate 60 to permit a separation of the material along the line. That is, the line of weakness can render the laminate 60 sufficiently frangible that the material can be separated into distinct pieces. This allows for an installer to remove an area of material from the laminate 60 (or assembly 160), such as a vent hole, during installation, without requiring the use of separate tools or knives. That is, the installer merely applies a tearing or rendering force along the lines of weakness and the portions of the reflective laminate 60 (or assembly 160) are separated.

Figure 11:
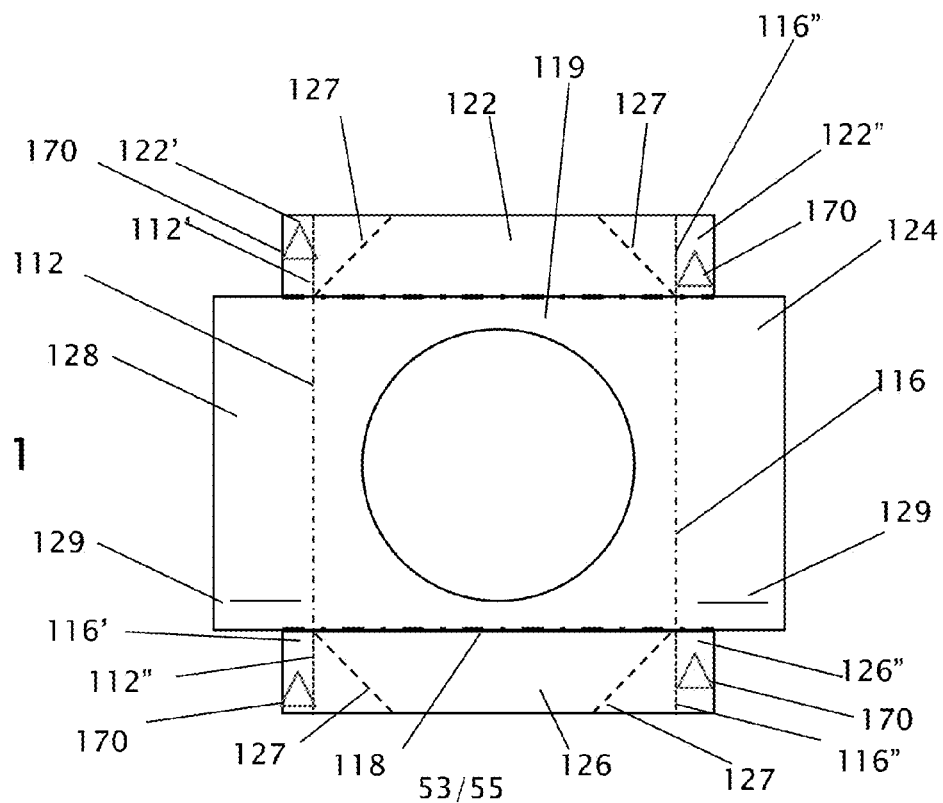
FIG. 11 is a plan view of a cut out of a reflective laminate showing the components prior to folding and bonding to form the insulating assembly.
Figure 12:
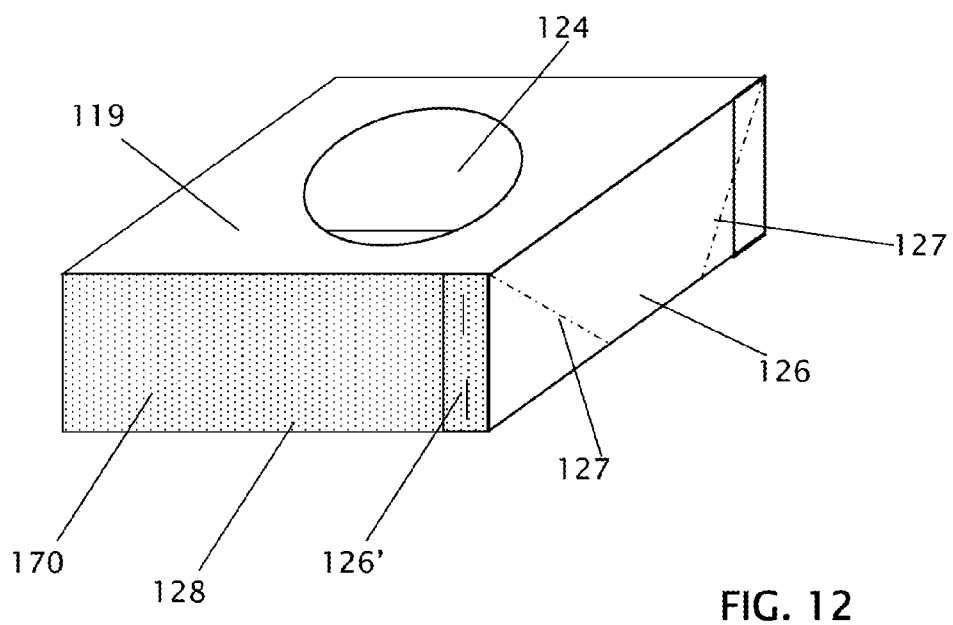
FIG. 12 is perspective view of the reflective laminate cut out of FIG. 11 forming an insulating assembly having a base and sidewalls inclined relative to the base.
Figure 13:
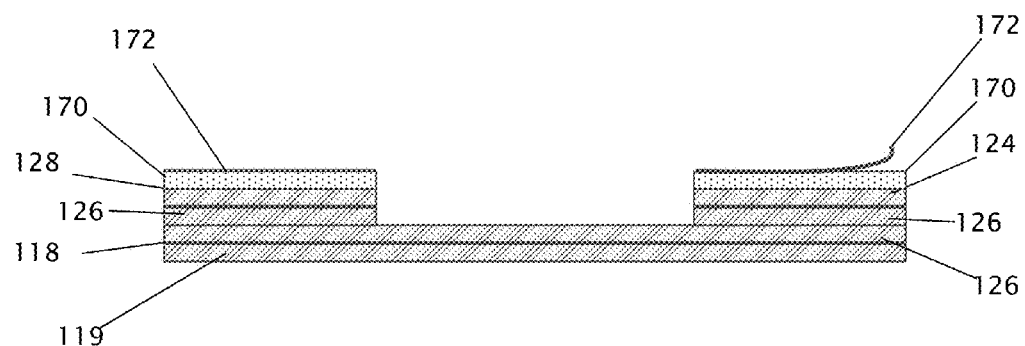
FIG. 13 is representative cross sectional view of the insulating assembly of FIG. 12 in a folded or transport configuration.
Figure 14:
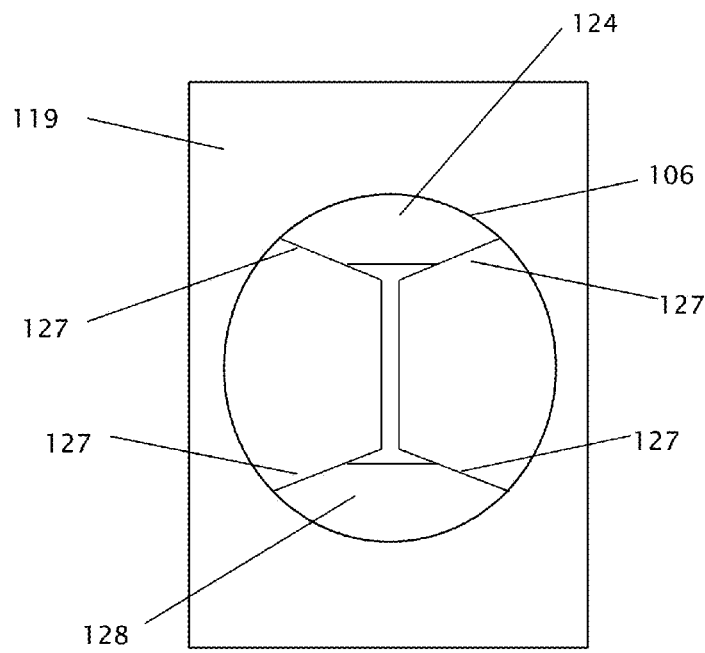
FIG. 14 in a top plan view of the insulating assembly of FIG. 12 in the folded or transportation configuration.

Referring to FIGS. 10-13, the reflective laminate layer 60 can be thus formed into the self-supporting reflective laminate body or insulating assembly 160 having the base 119 and the four extending sidewalls 122, 124, 126 and 128, wherein the sidewalls are at least substantially perpendicular to the base. Longer sidewalls 122, 126 can each include two collapsing fold lines 127. The collapsing fold line 127 extends from the junction of the base 119, the longer opposing sidewall 122, 126 and one of the shorter sidewalls 124, 128 at an approximate 45 degree angle to the free edge of the longer sidewall. The collapsing fold lines 127 form triangular portions in the longer of the sidewalls, such that as the short sidewalls 124, 128 are folded about fold lines 116, 112 respectively, toward each other, the longer sidewalls 122, 126 rotate towards each other about respective fold lines 114, 118 and the triangular portions fold about the adjacent collapsing fold line 127 until the base 119, the shorter sidewalls 124, 128, the triangular portions and the remaining portions of the longer sidewalls 122, 126 are parallel as seen in FIG. 13. The resulting collapsed structure has a thickness of 4 layers of the reflective laminate 60.

In addition, as seen in FIG. 11 the sidewalls 122 and 126 can include projecting tabs 122', 122" and 126' and 126" respectively, wherein the projecting tabs are folded to overlay a portion of the adjacent sidewall and fastened to that sidewall, such as by staples, adhesives, stitching or bonding to form the self-supporting assembly.

As set forth above, the tabs 122', 122" and 126' and 126" can be configured to be received in corresponding slots 129 (shown in FIG. 11) in the adjacent sidewall to operably engage the sidewalls, such as in the open orientation.

As in the alternative construction, the longer sidewalls 122, 126 can include collapsing fold lines 127 and the joined sidewalls 124, 128 can be folded about the respective fold lines and the respective sidewalls folded about the collapsing fold lines such that a majority of the sidewalls are parallel to a majority of the base 119 and the sidewalls generally overlie the base.

Thus, the insulating assembly 160 can be compactly configured for efficient shipment and storage. In the shipping or storage configuration, the sidewalls or flaps 120, 122, 124 and 126 or portions are folded about the respective fold lines 112, 114, 116, 118 so that the sidewalls are substantially parallel to each other as well as the base 119. Further, in one configuration, the folded sidewalls 120, 122, 124 and 126 are within the footprint (or periphery) of the base 119. In response to customer need for an existing HVAC duct component to have increase R value or a retailer wishing to offer a line of such components having increased R value, the insulating assembly 160 can be unfolded to assume the self-supporting configuration, wherein the sidewalls 122, 124, 126, 128 are generally perpendicular to the base 119.

To transition the insulating assembly 160 from the transport configuration to the installation configuration, the sidewalls 122, 124, 126, 128 rotate about the respective fold lines until the sidewalls are perpendicular to the base 119, and the assembly is self-supporting. The opened insulating assembly 160 can then be slid over the outside surface of the HVAC component or tucked within the HVAC component, depending on the intended operation.

Thus, a collapsible insulating assembly 160 for HVAC ductwork is provided, wherein the assembly can be disposed in a transport configuration, wherein the walls or portions are folded about fold lines to be at least substantially parallel with each other and the base 119 and an operative configuration, wherein the opened insulating component encompasses a portion or is encompassed by a portion of a HVAC ductwork.

It is contemplated that one layer of the reflective laminate 60 can be scored or actually cut along the desired fold lines 112, 114, 116, 118, such as each fold line or alternating fold lines, thereby reducing the effective radius of curvature of the bend. In one configuration, the cut (or score) is formed along the outside surface of the respective fold line 112, 114, 116, 118, that is the surface of the laminate experiencing the greater radius of curvature. It is contemplated the fold lines 112, 114, 116, 118 for one, a pair or all the sidewalls can be scored to provide the reduced bending deformation and assist in disposing the insulating assembly 160 in the transport configuration. Thus, the remaining thickness of the reflective laminate 60 forms a hinge about which the sidewall can pivot relative to the base 119.

To incorporate both insulation layers 50, 60 into the register box 20, the mineral wool (layer) 50 is located along the inside surface 34 of the register box 20. The perimeter edges of the mineral wool layer 50 engage the lip 44 of the register box 20 to secure the mineral wool layer 50 in place. The second insulation layer 60 (the reflective laminate layer) is then placed along the top (exposed) surface of the mineral wool, wherein a perimeter edge of the second insulation layer 60 engages the lip 44 of the register box 20 securing the second insulation layer in place. In one configuration, an adhesive as described supra is placed between the mineral wool layer 50 and the reflective laminate layer 60 to provide the bonded composite 100. Alternatively, the second insulation layer can be located against the mineral wool, and retained in place by a slight compressive force from the lip 44 and the adjacent sidewall. The combined thickness of the mineral wool layer 50 and the reflective laminate layer 60 (and hence composite 100) is less than two inches, and in selected configurations, less than approximately 1 inch, depending on the specific configuration of the transition box.

Thus, as the second insulation layer 60 is in contact with the passing air flow in the register box 20, there is no exposed mineral wool to the air flow through the register box 20. Therefore, less mineral wool is entrained in the passing air flow, and indoor air quality is improved.

In another configuration, the mineral wool layer 50 is disposed within the existing register box 20 and the second insulation layer 60 (the reflective laminate) is disposed on the outside of the register box 20 as shown in FIGS. 2 and 6. The mineral wool layer 50 can be inserted into the register box 20, for example, as described in supra. For the exemplary embodiment shown in FIG. 1, the second insulation layer 60 overlies the outside surface 36 of the sidewalls 22, 24, 26, 28 and back wall 30 of the register box 20. The second insulation layer 60 further includes triangular tabs 138 located at each corner of the sidewalls 22, 24, 26, 28, wherein each triangular tab 138 lies flat along a portion of the second insulation layer 60. In one configuration, two triangular tabs 138 overlie one sidewall 22 and two triangular tabs overlie the opposing sidewall 26. The triangular tabs 138 are secured to the register box 20 by fasteners 140. Fasteners 140 can include, but are not limited to, pins, adhesives, screws, staples and nails. In another configuration, the triangular tabs 138 are secured to the second insulation layer 60. For example, triangular tabs 138 can be fastened and/or adhered to the surface of the second insulation layer 60. In a further configuration, selected sidewalls can include an integral tab sized to overlie a portion of the an adjacent sidewall (in the operable configuration) wherein the tab is secured to the adjacent sidewall by any of the previously listed fasteners.

In both configurations, the enhanced insulation capacity of the present invention reduces energy costs as well as increases useful life of the register box.

Thus, the reflective laminate body 160 can be sized fit within the transition box 20 or slide over the outside surface of the transition box. For either configuration, the sizing of the reflective laminate body 160 can be selected to provide a friction fit or retention, or cooperate with fasteners including mechanical fasteners or adhesives, such as adhesive layer 170.

In a further configuration, the insulating assembly 160 is shipped in the shipping configuration, with the base 119 and sidewalls 120, 122, 124 and 126 being substantially parallel. In use, the insulating assembly 160 is transitioned to the installation configuration and engaged with the HVAC component, such as the transition box 20. The insulating assembly 160 can be engaged directly to the transition box 20 on either the inside surface 34, the outside surface 36 or if two insulating assemblies are employed, both the inside surface and the outside surface.

The resulting construction includes the transition box 20 having the reflective laminate 60 insulating assembly 160 in a thermal barrier engagement relative to the inside surface 34, the outside surface 36 or both the inside surface and the outside surface of the transition box 20—wherein additional insulation layers of different material can be located intermediate the insulating component and the transition box or the additional insulation layers can be engaged to locate the insulating assembly intermediate the respective surface of the transition box and the additional insulation layer.

The use of the prefabricated insulating assembly 160 gives the installer the flexibility to use one or two of the assemblies with or without additional insulating layers, such as the batten or wool. The insulating assemblies 160 can be located relative to the transition box 20 with one on the inside surface, one on the outside surface or both on either the inside surface or the outside surface of the transition box—with or without additional layers of different insulation, wherein the additional layers of insulation can be exterior to the insulating assembly 160 or intermediate the insulating assembly and the transition box.

A retailer could inventory a transition box 20 of a given dimension having the layer of mineral wool on the inside surface providing an R value of approximately 4. By virtue of the present disclosure, the reflective laminate assembly 160 can be selectively located on the inside or the outside of the transition box, thereby increasing the effective R value of the transition box to 6, or 8 or more, depending on the thickness of the reflective laminate (the reflective laminate assembly).

In an alternative configuration, at least the back wall 30 of the transition box 20 can be formed of duct board. Satisfactory duct boards include those by Johns Manville, Owens Corning as well as CertainTeed Saint-Gobain. The duct board is able to be readily cut by commercially available knives. Thus, the transition box 20 can be formed with only a single access port, the large access port 38, wherein the transition box includes the insulation and reflective laminate 60 as in the configurations set forth above. It is understood, the insulating assembly 160 can be constructed to be without apertures (other than the main opening of the box), such that the installer can form the necessary specific ports for installation. Also, the insulating assembly 160 can include the lines of weakness for preferential separation of portions of the assembly to match the corresponding transition box 20.

The installer on-site then uses the commercially available knife and forms an access port in the back wall 30 as dictated by the on-site construction. The formed access port extends though the insulating material as well as the duct board. Thus, the installer can form any of a variety of access ports such as a circular access port, wherein a separate tab collar, as known in the art, can be used to interconnect the transition box to the on-site duct. This configuration of the transition box 20 including a duct board wall (or portion of the wall), provides for the installer on-site to customize the transition box, without sacrificing the thermal performance of the transition box.

It is contemplated that one, two or more walls of the transition box can be partly or completely formed of the duct board. In one configuration, the entire transition box is formed of duct board, thereby allowing the on-site installer to fully customize the transition box to the on-site construction. As the insulating assembly 160 can be assume an open configuration corresponding to the transition box 20, the installer can simultaneously modify the transition box and the insulating assembly on site to accommodate unique (or even standard) configurations.

Thus, by locating the insulating assembly 160 (without having any preformed apertures or ports in the base or sidewalls) about the HVAC component, such as the transition box 20, the installer can then custom cut the duct board and the adjacent portion of the insulating assembly to form a matching construction of the HVAC component and the insulating assembly. That is, by cutting the duct board of the HVAC component and the insulating assembly 160 substantially simultaneously (while they are operably aligned), the resulting fit between the HVAC component and the insulating assembly is ensured.

The insulating assembly 160 can be used in conjunction with any other insulating material, wherein the ordering (layering) of the materials relative to the environmental temperature gradient can be in any order.

In a further configuration, as seen in FIGS. 11, 12 and 13, the reflective laminate 60 and insulating assembly 160 can include a layer of adhesive 170. The adhesive layer 170 can be substantially uniform across the area of the reflective laminate 60 or the insulating assembly 160. Alternatively, the adhesive layer 170 can be applied in a pattern either to reduce the amount of adhesive used or in a predetermined pattern to accomplish a function such as bonding to a portion of the transition box 20 or another layer of insulation upon engagement.

The adhesive layer 170 is shown in predetermined areas on the flaps in FIG. 11. It is understood the predetermined areas can be on any portion of the assembly 160 for either retaining the assembly in the operating orientation or bonding the assembly to the HVAC component. For example, the adhesive layer 170 can be applied on a majority of an inside or outside surface of the insulating assembly 160, such that upon operable installation of the assembly with the HVAC component, the adhesive layer (if on the inside of the assembly) retains the assembly relative to the outside of the HVAC component or additional insulating layer, if present, on the outside of the HVAC component and the adhesive layer (if on the outside of the assembly) retains the assembly relative to the inside of the HVAC component, or additional insulating layer, if present, on the inside of the HVAC component.

The adhesive can be a tape or contact adhesive with or without a removable backing layer 172. In use, the installer configures the reflective laminate 60 or insulating assembly 160 in the operable configuration (removes the backing layer 172, if employed) and presses the reflective laminate or insulating assembly into engagement, wherein the adhesive retains the laminate or assembly is operably retained. As seen in FIG. 12, a representative sidewall 128 includes the adhesive layer 170. Referring to FIG. 13, the adhesive layer 170 is shown (in exaggerated thickness) on sidewalls 124 and 128, wherein the backing layer 172 is shown in a partially peeled configuration relative to sidewall 124.

The adhesive can be a tape such as 3M Double Coated Tapes or contact adhesive as known in the art, such as 3M Hi-Strength spray adhesive or Fastbond™ adhesive as well as Scotch-Weld™ adhesive.

While the invention has been described in connection with a particular embodiment, it is not intended to limit the scope of the invention to the particular form set forth, but on the contrary, it is intended to cover such alternatives, modifications, and equivalents as may be included within the spirit and scope of the invention as defined by the appended claims.

The invention claimed is:

1. An insulated HVAC duct component comprising:
    (a) a transition box having an inside surface, two sets of opposing sidewalls, a back wall, and a front wall, the front wall having a rectangular outlet and an extending lip, the extending lip having height extending perpendicularly from the front wall along the perimeter of the rectangular outlet of the transition box, at least one of the two sets of opposing sidewalls having a flange with a length extending perpendicularly from each respective sidewall, the height of the extending lip being less than the length of each flange of the at least one of the two sets of opposing sidewalls;
    (b) a mineral wool layer having a first R value, the mineral wool layer being adjacent to one of an inside surface and an outside of the transition box to insulate the HVAC duct component; and
    (c) a reflective laminate layer having a second R value, the reflective laminate layer abutting the mineral wool layer, and the reflective laminate layer having an upper reflective layer, a bottom reflective layer, and a cellular layer, the cellular layer being intermediate the upper reflective layer and the bottom reflective layer, and the cellular layer having a plurality of closed cells that provide resistance to thermal flow
    (d) wherein said cellular layer has a nominal thickness between 3/16 inch and 1/2 inch.

2. The insulated HVAC duct component of claim 1, further comprising an adhesive layer intermediate the mineral wool layer and the reflective laminate layer, the adhesive layer being adjacent to the mineral wool layer, wherein the adhesive layer partially penetrates the mineral wool layer and forms an integral bond between the mineral wool layer and the reflective laminate layer, the formation of the integral bond decreasing the amount of air gaps formed between the mineral wool layer and the reflective laminate layer, the formation of the integral bond increasing the rigidity of the mineral wool layer and the reflective laminate layer.

3. The insulated HVAC duct component of claim 1, wherein the first R value is greater than the second R value.

4. The insulated HVAC duct component of claim 2, wherein the reflective laminate layer is sized to overlap the back wall and two opposing sidewalls of the register box and the other two opposing sidewalls of the transition box.

5. The insulated HVAC duct component of claim 1, wherein a portion of the transition box is formed of duct board.

6. The insulated HVAC duct component of claim 1, wherein the reflective laminate layer includes a continuous piece having a base and four side portions, the base sized to overlap the back wall of the transition box and the four side portions sized to overlap corresponding opposing sidewalls of the transition box.

7. The insulated HVAC duct component of claim 1, wherein the mineral wool layer has a nominal thickness of 1 inch and the reflective laminate layer has a nominal thickness of 5/16 inches.

8. The insulated HVAC duct component of claim 1, wherein the mineral wool layer and the reflective laminate layer are removably secured in the transition box by the extending lip.

9. The insulated HVAC duct component of claim 1, wherein the transition box is formed of sheet metal.

10. An insulated HVAC duct component comprising:
    (a) a transition box having an inside surface, four sidewalls, a top wall, and a back wall, the top wall having a first access port and the back wall having a second access port, the first access port having a different cross section than the second access port, one of the access ports being spaced from a nearest sidewall by less than 2 inches, the top wall further having an extending lip, the extending lip having height extending perpendicularly from the top wall along the perimeter of the first access port of the transition box, at least two of the four sidewalls having a flange with a length extending perpendicularly from each respective sidewall;

(b) a first insulation layer located along the inside surface of the transition box to abut the inside surface of the transition box to insulate the HVAC duct component; and (c) a different second insulation layer overlying the first insulation layer, the second insulation layer having an upper reflective layer, a bottom reflective layer and a cellular layer, the upper reflective layer and the bottom reflective layer being air impervious surfaces, the cellular layer being intermediate the upper reflective layer and the bottom reflective layer, and the cellular layer having a plurality of closed cells that provide resistance to thermal flow, wherein the combined thickness of the first insulation layer and the second insulation layer is less than 2 inches.

11. The insulated HVAC duct component of claim 10, wherein the transition box is rectangular.

12. The insulated HVAC duct component of claim 10, wherein the first access port is rectangular and wherein the second access port is circular.

13. The insulated HVAC duct component of claim 10, wherein the first insulation layer and the second insulation layer have a total R value of at least 8.

14. The insulated HVAC duct component of claim 10, wherein the first insulation layer and the second insulation layer are retained between the extending lip and each respective sidewall.

15. The insulated HVAC duct component of claim 10, wherein the plurality of closed cells of the cellular layer is a plurality of bubbles, each bubble of the plurality of bubbles having a volume of gas that can be controlled to provide different degrees of thermal protection and to control the resulting thickness of the cellular layer.

16. The insulated HVAC duct component of claim 10, further comprising an adhesive layer bonding with the mineral wool layer, the adhesive layer being adjacent to the mineral wool layer, wherein the adhesive layer partially penetrates the first insulation layer and forms an integral bond between the first insulation layer and the second insulation layer, the formation of the integral bond decreasing the amount of air gaps formed between the first insulation layer and the second insulation layer, and the formation of the integral bond increasing the rigidity of the first insulation layer and the second insulation layer.

* * * * *